(12) United States Patent
Jung (10) Patent No.: US 10,797,274 B2
(45) Date of Patent: Oct. 6, 2020

(54) SECONDARY BATTERY

(71) Applicant: Samsung SDI Co., Ltd., Yongin-si, Gyeonggi-do (KR)

(72) Inventor: Hyun Ki Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 157 days.

(21) Appl. No.: 15/296,981

(22) Filed: Oct. 18, 2016

(65) Prior Publication Data

US 2017/0117516 A1 Apr. 27, 2017

(30) Foreign Application Priority Data

Oct. 26, 2015 (KR) .................. 10-2015-0148672

(51) Int. Cl.
| | | |
|---|---|---|
| *H01M 2/00* | (2006.01) | |
| *H01M 2/06* | (2006.01) | |
| *H01M 2/04* | (2006.01) | |
| *H01M 2/02* | (2006.01) | |
| *H01M 2/34* | (2006.01) | |

(52) U.S. Cl.
CPC ........... *H01M 2/06* (2013.01); *H01M 2/0277* (2013.01); *H01M 2/0404* (2013.01); *H01M 2/046* (2013.01); *H01M 2/0482* (2013.01); *H01M 2/0491* (2013.01); *H01M 2/348* (2013.01); *H01M 2/022* (2013.01); *H01M 2200/106* (2013.01)

(58) Field of Classification Search
CPC .... H01M 2/06; H01M 2/0277; H01M 2/0404; H01M 2/046; H01M 2/0482; H01M 2/0491; H01M 2/348; H01M 2/022; H01M 2200/106
See application file for complete search history.

(56) References Cited

U.S. PATENT DOCUMENTS

| | | | | |
|---|---|---|---|---|
| 2009/0061310 A1* | 3/2009 | Kim | .................... | H01M 2/0413 429/185 |
| 2010/0159288 A1* | 6/2010 | Kim | .................... | H01M 2/0413 429/7 |

FOREIGN PATENT DOCUMENTS

| | | |
|---|---|---|
| JP | 09-120806 A | 5/1997 |
| JP | 5108423 B2 | 12/2012 |

\* cited by examiner

*Primary Examiner* — Raymond Alejandro
(74) *Attorney, Agent, or Firm* — Lewis Roca Rothgerber Christie LLP (57) ABSTRACT

A secondary battery includes an electrode assembly including a first electrode, a second electrode, and a separator between the first electrode and the second electrode, a cap assembly electrically connected to the first electrode, a case accommodating the electrode assembly therein, the case having an opening in which the cap assembly is inserted, a first insulator between the cap assembly and the case, and a second insulator between the first insulator and the cap assembly. In the secondary battery, the second insulator has a higher melting point than the first insulator, thereby improving durability.

13 Claims, 5 Drawing Sheets

SECONDARY BATTERY

CROSS-REFERENCE TO RELATED APPLICATION

This application claims priority to, and the benefit of, Korean Patent Application No. 10-2015-0148672, filed on Oct. 26, 2015, in the Korean Intellectual Property Office, the entire content of which is incorporated herein by reference.

BACKGROUND

1. Field

Aspects of embodiments of the present disclosure relate to a secondary battery.

2. Description of the Related Art

In general, a secondary battery can be charged and discharged multiple times. A secondary battery can be charged by using, as energy sources, not only energy from existing power systems, but also solar energy and renewable energy. Secondary batteries are used as energy sources for not only electronic devices, such as cellular phones, notebook computers, and camcorders, but also for automobiles and large-sized facilities requiring power supply.

A plurality of secondary batteries may be connected in series and/or in parallel to implement a high-output or high-capacity power storage device, when necessary for the given application. The power storage device will often include a controller to control charging and/or discharging of the secondary batteries, and for preventing overcharging and/or overdischarging of the secondary batteries, when necessary.

SUMMARY

Embodiments of the present invention are directed toward a secondary battery having improved durability.

According to an aspect of the present disclosure, there is provided a secondary battery including an electrode assembly, a cap-up electrically connected to a first electrode of the electrode assembly, a case accommodating the electrode assembly therein and defining an opening in which the cap-up is inserted, a first insulator between the cap-up and the case, and a second insulator between the first insulator and the cap-up.

The electrode assembly may include the first electrode, a second electrode, and a separator between the first electrode and the second electrode.

The second insulator may have a higher melting point than that of the first insulator.

The cap-up may have a circumferential flange and the second insulator may be between the flange of the cap-up and the first insulator.

The case may include a clamping portion bent toward the second insulator at an edge of the case at the opening.

The first insulator may be compressed toward the second insulator by the clamping portion.

The first insulator may extend to the outside of the case between the clamping portion and the second insulator.

The second insulator may extend inward in a radial direction of the cap-up between the first insulator and the cap-up.

At least one portion of the second insulator may extend outside the first insulator.

The second insulator may be ring shaped with internal and external diameters.

The cap-up may include a convex portion that convexly protrudes outside of the case through an opening defined by the internal diameter of the second insulator, and the flange that extends outward in the radial direction from the convex portion, the flange having the second insulator mounted thereon.

The flange of the cap-up may have a step that engages a portion of the second insulator at the internal diameter of the second insulator.

The flange of the cap-up may have at least one groove to which the second insulator is engaged. The second insulator may include a projection inserted into the groove.

The second insulator may be at least partially coated on the flange of the cap-up.

According to another aspect of the present disclosure, there is provided a secondary battery including an electrode assembly including a first electrode, a second electrode, and a separator between the first electrode and the second electrode, a cap assembly electrically connected to the first electrode, a case accommodating the electrode assembly therein, the case having an opening in which the cap assembly is inserted, a first insulator between the cap assembly and the case, and a second insulator between the first insulator and the cap assembly.

The second insulator may have a higher melting point than the first insulator.

The cap assembly includes a cap-up.

The cap-up may be electrically connected to the first electrode so as to be a terminal for the first electrode.

The cap assembly may further include a current interrupt device provided between the electrode assembly and the cap-up and being electrically connected to the cap-up.

The second insulator may be between the cap-up and the first insulator.

The cap-up may convexly protrude away from the current interrupt device by passing through an opening in the second insulator.

BRIEF DESCRIPTION OF THE DRAWINGS

Example embodiments will now be described more fully hereinafter with reference to the accompanying drawings, in which.

DETAILED DESCRIPTION

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
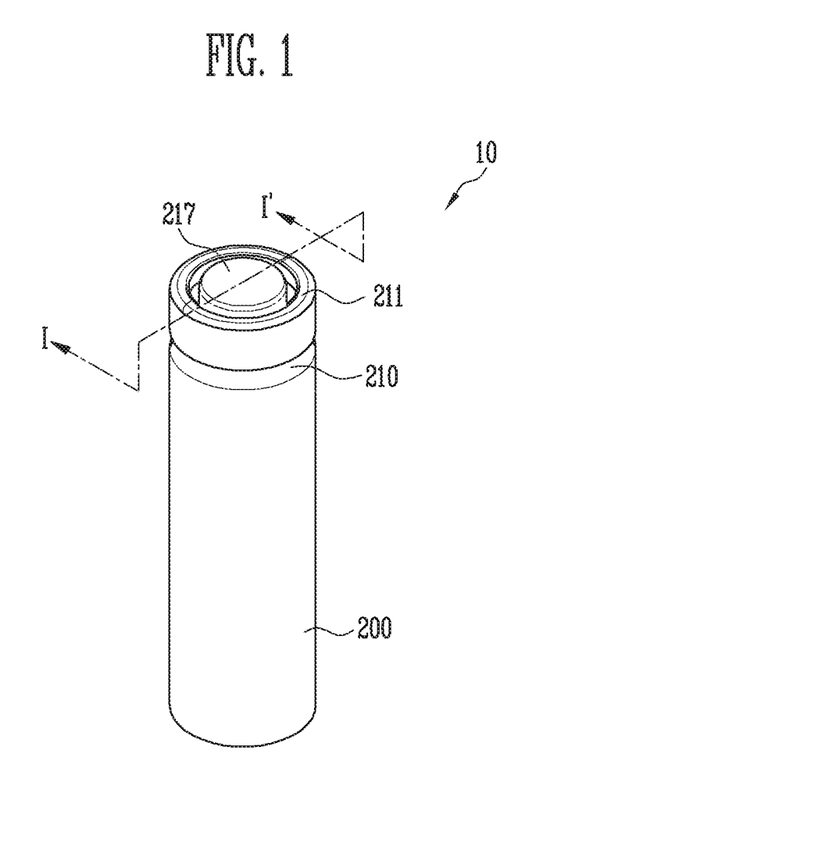
FIG. 1 is a perspective view of a secondary battery according to an embodiment of the present disclosure.
Figure 2:
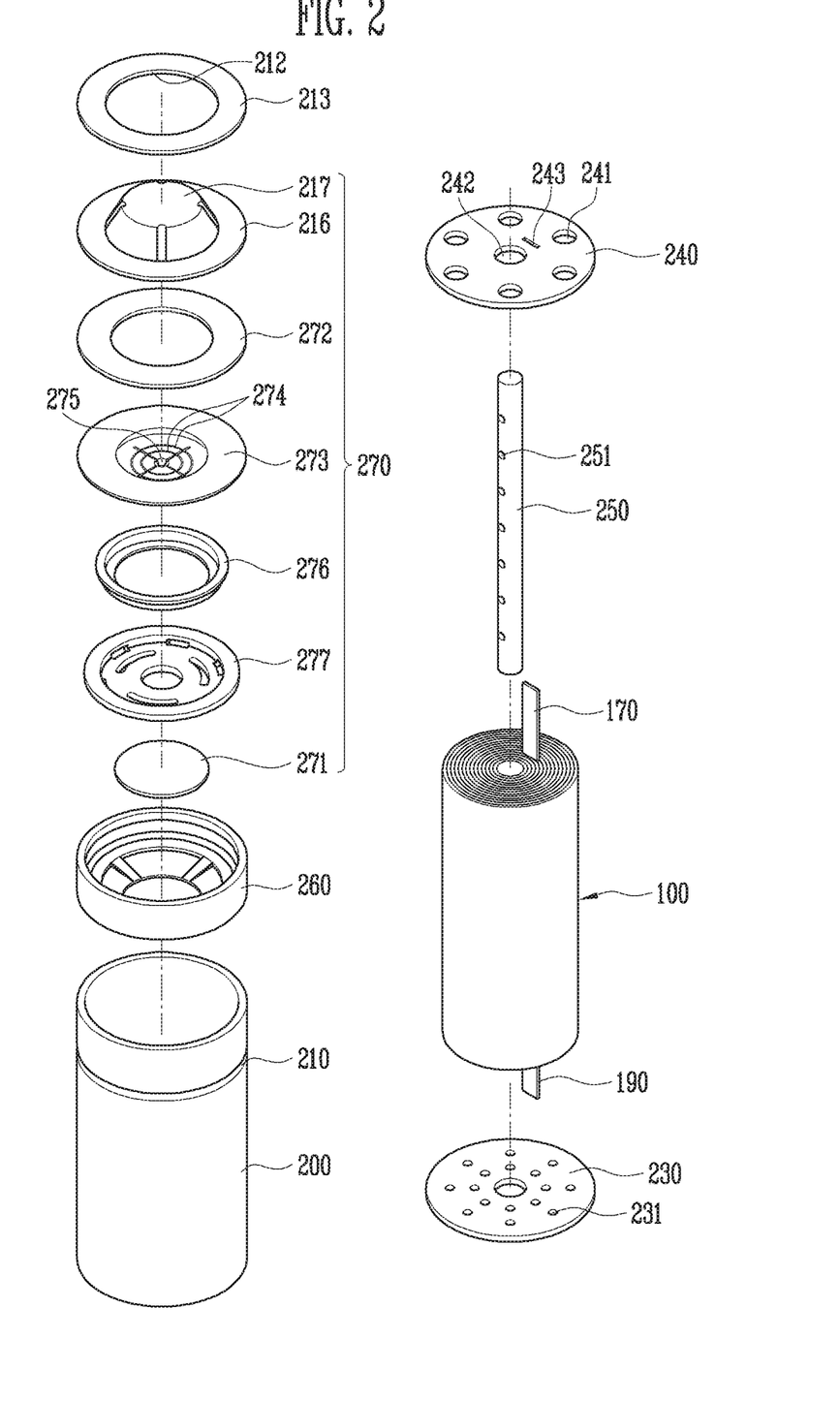
FIG. 2 is an exploded perspective view of the embodiment of FIG. 1.
Figure 3:
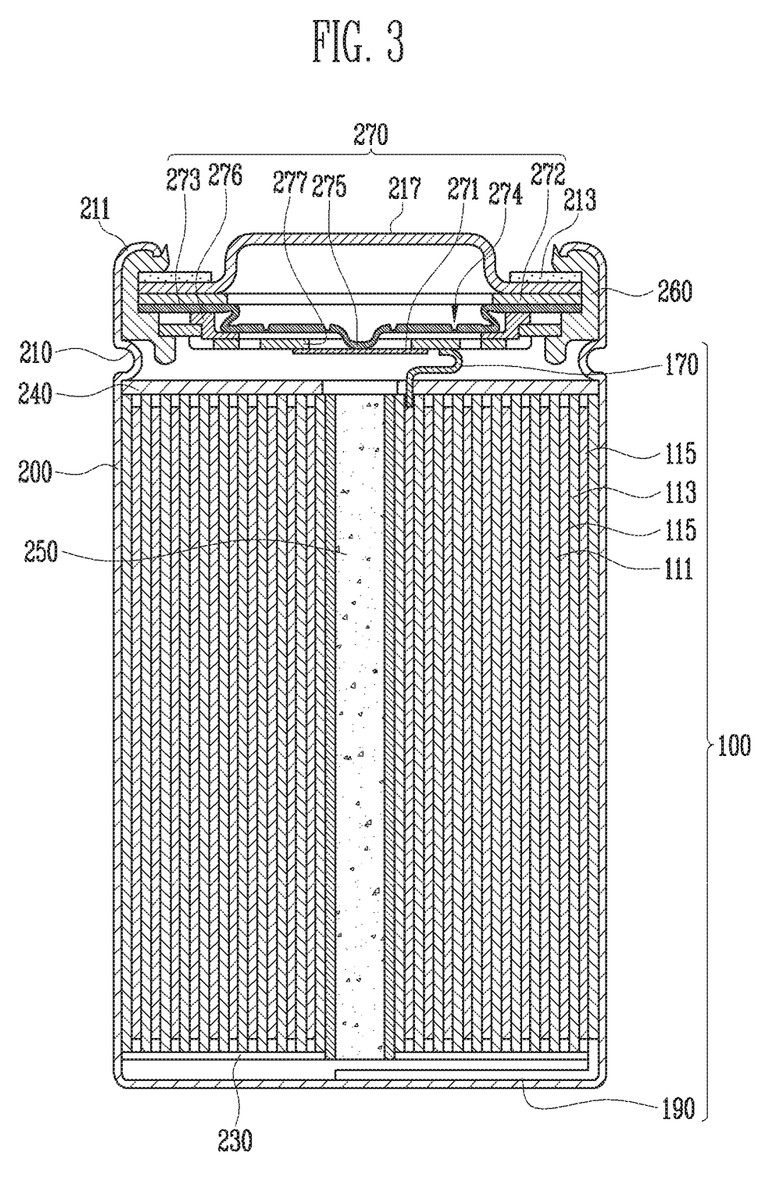
FIG. 3 is a sectional view taken along the line I-I' of the embodiment of FIG. 1.

FIG. 1 is a perspective view showing the exterior of a secondary battery according to an embodiment of the present disclosure. FIG. 2 is an exploded perspective view of the embodiment of FIG. 1. FIG. 3 is a sectional view taken along the line I-I' of the embodiment of FIG. 1. The secondary battery 10 according to this embodiment of the present disclosure includes an electrode assembly 100, a plurality of insulating plates 230 and 240, a center pin 250, a case 200 accommodating the electrode assembly 100 therein, a cap assembly 270 coupled to an opening of the case 200, and a first insulator 260 and a second insulator 213, which seal, together with the cap assembly 270, the opening of the case 200.

As shown in FIG. 3, the electrode assembly 100 includes first and second electrodes 113 and 111, and a separator 115 between the first and second electrodes 113 and 111. The first and second electrodes 113 and 111 have different polarities. If one electrode has a positive polarity, the other electrode has a negative polarity. The first electrode 113, the separator 115, and the second electrode 111 are sequentially stacked, and are then wound.

The electrode assembly 100 includes a first electrode tab 170 electrically connected to the first electrode 113, and a second electrode tab 190 electrically connected to the second electrode 111. Energy generated from the electrode assembly 100 is transmitted to the outside by the first and second electrode tabs 170 and 190. The first and second electrode tabs 170 and 190 include a conductive material, and, for example, may include nickel (Ni) or a Ni alloy.

The first electrode tab 170 is fixed to a plate 271 or a cap-down 277. The first electrode tab 170 may be welded to the plate 271 or to the cap-down 277. The first electrode 113 is electrically connected to the cap assembly 270 through the first electrode tab 170.

The first electrode tab 170 is connected to a non-coated portion of the first electrode 113, and extends to the outside of the wound electrode assembly 100. The first electrode 113 may be provided with a sheet-shaped current collector that is partially coated with an active material layer, while a portion that is not coated with the active material layer is defined as the non-coated portion. The second electrode tab 190 is connected to a non-coated portion of the second electrode 111, and extends to the outside of the wound electrode assembly 100. The second electrode 111 may be provided with a sheet-shaped current collector that is partially coated with an active material layer, while a portion that is not coated with the active material layer is defined as the non-coated portion.

The current collector of the first electrode 113 and the current collector of the second electrode 111 are thin metal films, and may include at least one of stainless steel, nickel, copper, aluminum, and/or an alloy thereof.

When the first electrode 113 is a positive electrode and the second electrode 111 is a negative electrode, the active material layer of the first electrode 113 may include a positive electrode active material. The positive electrode active material may include an oxide containing lithium. However, the present disclosure is not limited thereto, and any positive electrode active material may be used without limitation. In addition, the active material layer of the second electrode 111 may include a negative electrode active material. The negative electrode active material may include at least one of carbon, graphite, and/or silicon. However, the present disclosure is not limited thereto, and any negative electrode active material may be used without limitation.

Alternatively, the first electrode 113 may be a negative electrode and the second electrode 111 may be a positive electrode. In this case, the current collector of the first electrode 113 is coated with a negative electrode active material layer, and the current collector of the second electrode 111 is coated with a positive electrode active material layer.

The case 200 is a cylinder having one open end, the cylinder being formed with, or defining, a space in which the electrode assembly 100 is accommodated. The second electrode tab 190 may be welded to a bottom surface of the case 200, so that the case 200 can function as an electrode terminal of the second electrode 111. The case 200 may be formed of stainless steel, aluminum, or equivalents thereof, but the present disclosure is not limited thereto.

The plurality of insulating plates 230 and 240 include a first insulating plate 240 at a side where the electrode assembly 100 faces an opening of the case 200, and a second insulating plate 230 at a side where the electrode assembly 100 faces a surface opposite the opening of the can 200 (i.e., the bottom surface of the case 200). An undesired electrical short between the electrode assembly 100 and the case 200 may be prevented or substantially prevented by the first and second insulating plates 240 and 230.

The first insulating plate 240 may be provided with a plurality of openings 241 (e.g., a plurality of holes 241) through which an electrolyte is well sunk into the electrode assembly 100. In addition, the first insulating plate 240 may be provided with an opening 243 (e.g., a hole 243) through which the first electrode tab 170 extending from the electrode assembly 100 may pass. The second insulating plate 230 is provided with a plurality of openings 231 (e.g., a plurality of holes 231) to reduce or minimize the space occupied by the second insulating plate 230, thereby increasing the space in which the electrolyte may be injected.

The center pin 250 is at the center axis of the electrode assembly 100 to prevent or substantially prevent the electrode assembly from being unwound. The center pin 250 may be a cylindrical rod that is hollow, and one end of the center pin 250 may press the second electrode tab 190 so that the second electrode tab 190 adheres closely to the case 200.

When the center pin 250 is hollow, gas generated from the electrode assembly 100 may move through the hollow space of the center pin 250. The first insulating plate 240 is provided with an opening 242 (e.g., a hole 242) formed at a central portion of the first insulating plate 240, the opening 242 corresponding to the center pin 250, so that gas may be exhausted through the hole 242.

The center pin 250 may be provided with a plurality of openings 251 (e.g., a plurality of holes 251) formed at a side surface of the center pin 250, so as to facilitate distribution of the electrolyte, and so as to smoothly exhaust the gas generated from the electrode assembly 100.

An inwardly bent clamping portion 211 (i.e., clamp 211) is formed at an edge of the opening of the case 200. The clamping portion 211 compresses (i.e., pressurizes) the cap assembly 270, thereby improving the fastening force of the cap assembly 270. The case 200 is provided with a bead 210 formed to be inwardly convex between the opening and the electrode assembly 100. The internal diameter of the bead 210 is formed smaller than the external diameter of the electrode assembly 100, so that the electrode assembly 100 is fixed below the bead 210 so as not to substantially move in the case 200.

The cap assembly 270 includes a cap-up 217 serving as an electrode terminal, and a current interrupt device between the cap-up 217 and the electrode assembly 100.

The cap-up 217 serves as a terminal of the first electrode 113 of the electrode assembly 100. The cap-up 217 is formed in an outwardly convex shape, and has a flange 216 provided at an edge thereof, as seen in FIG. 2. Several openings (e.g., several holes) for exhausting gas may be formed in the cap-up 217.

The second insulator 213 is a ring-shaped insulator having substantially the same external diameter as the flange 216 of the cap-up 217. The second insulator 213 is stacked on the flange 216 of the cap-up 217, and a convex portion of the cap-up 217 is protruded outward by passing through the second insulator 213. That is, the convex portion of the cap-up 217 is inserted into an opening 212 (e.g., a hole 212) of the second insulator 213 to be convexly disposed outward.

The current interrupt device includes a positive temperature coefficient 272, a vent 273, a third insulator 276, the cap-down 277, and the plate 271, which are sequentially stacked in a direction facing the electrode assembly 100. However, the following current interrupt device is merely an embodiment, and the present disclosure is not limited thereto. The current interrupt device may be any configuration capable of interrupting current when an abnormal current flows, and capable of discharging gas when the internal pressure of the battery increases.

The positive temperature coefficient device 272 interrupts current when an overcurrent flows. The vent 273 includes a protruding portion 275 at the center thereof. The protruding portion 275 protrudes toward an opening (e.g., a hole) at the center of the cap-down 277. The protruding portion 275 protrudes to almost pass through the hole provided at the center of the cap-down 277. Thus, the protruding portion 275 may meet the plate 271.

The cap-down 277 is provided with an opening (e.g., a hole) serving as a path such that, when pressure in the secondary battery increases, the pressure can act on the vent 273. The plate 271 is adhered closely to the cap-down 277 between the electrode assembly 100 and the cap-down 277 to stop, or block, the hole provided at the center of the cap-down 277. The plate 271 may be electrically connected to the protruding portion 275 of the vent 273 through welding or the like. The vent 273 and the cap-down 277 are insulated from each other by the third insulator 276 between the vent 273 and the cap-down 277.

The vent 273 is provided with circular and cross-shaped grooves 274 formed around the protruding portion 275. If pressure in the secondary battery increases, as gas is generated in (e.g., inside) the secondary battery, the protruding portion 275 of the vent 273 moves toward the cap-up 217. As the vent 273 is deformed, as described above, a connecting portion between the plate 271 and the protruding portion 275 comes off, or a portion of the plate 271 is broken, thereby interrupting electrical flow. If pressure in the battery continuously increases, gas is exhausted to the outside as the grooves 274 are ruptured.

The first insulator 260 is a gasket that seals the opening of the case 200 and the cap assembly 270. The first insulator 260 simultaneously surrounds the outer circumference of the cap assembly 270 and the outer circumference of the second insulator 213 placed on the cap assembly 270. The first insulator 260 is surrounded by a portion extending from the opening of the case 200 to the bead 210. The first insulator 260 is adhered closely to the second insulator 213 and the cap assembly 270 by the clamping portion 211.

The first insulator 260 is made of a material having insulating properties and elasticity. For example, the first insulator 260 may include a polymer. The polymer, for example, may be poly butyl terephthalate (PBT) or poly propylene (PP).

The second insulator 213 may be interposed between the flange 216 of the cap-up 217 and the first insulator 260, as shown in FIGS. 2-3. The second insulator 213 has a higher melting point than the first insulator 260. That is, the material constituting the second insulator 213 melts at a higher temperature than the material constituting the first insulating material 260. In addition, the material constituting the second insulator 213 may have a weaker elasticity than the material constituting the first insulator 260. For example, the second insulator 213 may be made of a ceramic material. Alternatively, the second insulator 213 may be formed by coating an insulative oxide film on a metal ring. For example, the second insulator may be made of anodized aluminum.

The first insulator 260 is compressed (i.e., pressurized) toward the second insulator 213 by the clamping portion 211. Further, as shown in FIG. 3, the first insulator 260 extends from an end portion of the clamping portion 211 to the outside of the case 200 such that the end portion of the clamping portion 211 does not contact the second insulator 213. The first insulator 260 partially covers the second insulator 213.

It is illustrated that the second insulator 213 has the same external diameter as the flange 216 of the cap-up 217. However, the present disclosure is not limited thereto, and the external diameter of the second insulator 213 may be slightly smaller than the external diameter of the flange 216 of the cap-up 217. The second insulator 213 may be located at a portion corresponding to the opening of the case 200 (i.e., the end of the clamping portion 211) to block a space between a portion of the first insulator 260, and may be compressed (i.e., pressurized) by the clamping portion 211 and the flange 216 of the cap-up 217. In some embodiments, the second insulator 213 has a width extending along the radial direction of the cap-up 217. In this case, the width may considerably extend inward and outward in the radial direction from the portion corresponding to the end of the clamping portion 211. In addition, the external diameter of the second insulator 213 is not necessarily equal to the external diameter of the flange 216 of the cap-up 217.

The second insulator 213 is not limited to the ring-shaped member as shown in FIG. 2, and may be an insulating film, such as a ceramic coating layer, or such as an oxide film coated on the flange 216 of the cap-up 217. The oxide film may refer to an insulating film formed on the surface of a metal member through anodizing. The oxide film may include oxide films known in the art.

According to the configuration described above, although a portion of the first insulator 260, which meets the end of the clamping portion 211, is broken in an environment of a high temperature at which the first insulator 260 can be melted, the clamping portion 211 of the case 200 is contacted with the second insulator 213, thereby improving durability and safety.

Figure 4:
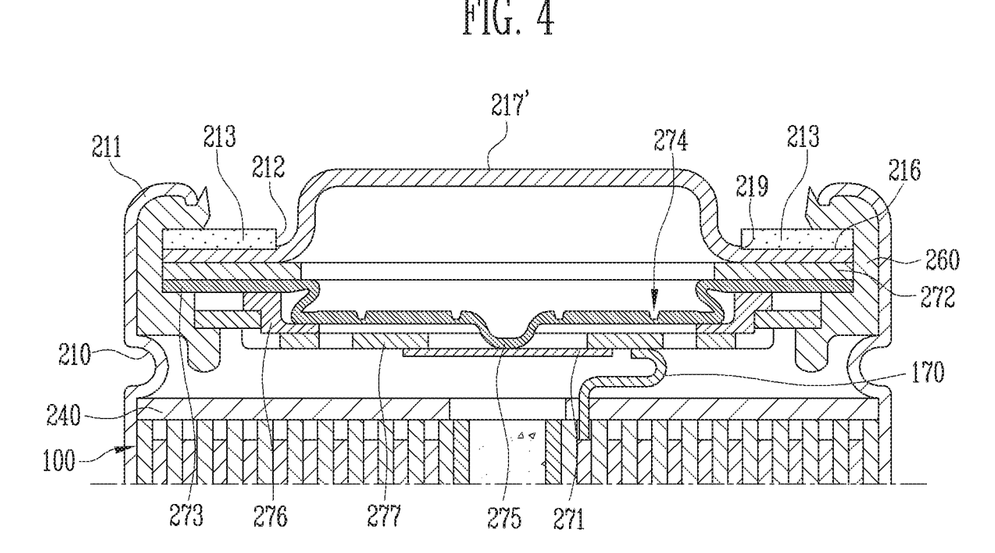
FIG. 4 is a partial sectional view showing a secondary battery to which a cap-up is applied according to another embodiment.
Figure 5:
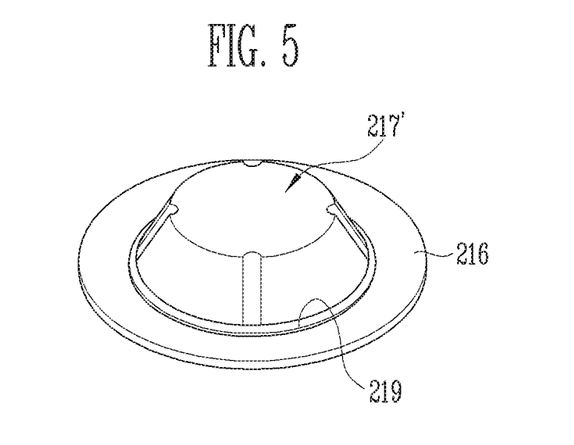
FIG. 5 is a perspective view of the cap-up according to the embodiment shown in FIG. 4.

FIG. 4 is a sectional view showing a cap assembly of a secondary battery, to which a cap-up 217' is applied, according to a another embodiment. FIG. 5 is a perspective view of the cap-up 217' according to the embodiment shown in FIG. 4.

The secondary battery according to the embodiment of FIG. 4 includes an electrode assembly 100, a plurality of insulating plates 230 and 240, a center pin 250, a case 200 accommodating the electrode assembly 100 therein, a cap assembly 270 coupled to an opening of the case 200, and a first insulator 260 and a second insulator 213, which seal, together with the cap assembly 270, the opening of the case 200.

The electrode assembly 100, the plurality of insulating plates 230 and 240, the center pin 250, the case 200, and the first and second insulators 260 and 213 are the same as described with reference to FIGS. 1 to 3. Like components are designated by like reference numerals, and repeated detailed descriptions thereof may be omitted.

The cap assembly 270 includes a cap-up 217' serving as an electrode terminal, and includes a current interrupt device provided between the cap-up 217' and the electrode assembly 100. The current interrupt device is the same as described with reference to FIGS. 1 to 3. Like components are designated by like reference numerals, and repeated detailed descriptions thereof may be omitted.

The cap-up 217' according to the present embodiment is further provided with a step 219 formed on the flange 216 of the cap-up 217 provided in the embodiment of FIG. 1. The step 219 is formed at a portion at which the cap-up 217' meets an edge (i.e., an internal diameter edge of the second insulator 213) where an opening 212 (e.g., a hole 212) of the second insulator 213 is defined. The thickness of a portion of a flange 216 of the cap-up 217' that extends outward in the radial direction from the step 219 is thinner by the height of the step 219 than the thickness of a portion of the flange 216 of the cap-up 217' that extends inward in the radial direction from the step 219. In other words, the step 219 decreases the thickness of the flange in a outwardly radial direction from the step 219 in an amount equal to the height of the step 219.

The edge of the hole 212 of the second insulator 213 is partially defined by the step 219 of the cap-up 217', and the second insulator 213 is mounted at a portion of the flange 216 at which the thickness of the flange 216 is decreased by the height of the step 219. In addition, the second insulator 213 may be compressed (e.g., pressurized) toward the flange 216 of the cap-up 217' by a clamping portion 211.

In FIG. 4, it is illustrated that the thickness of the second insulator 213 is greater than the height of the step 219, but the present disclosure is not limited thereto. The thickness of the second insulator 213 may be substantially equal to the height of the step 219 such that the entire height of the secondary battery is reduced or minimized. Also, the thickness of the second insulator 213 may be smaller than the height of the step 219 of the cap-up 217' as long as it has a strength enough to maintain the shape of the second insulator 213.

According to the configuration described above, the second insulator 213 can be stably fixed on the flange 216 of the cap-up 217'.

The second insulator 213 may not be provided as a separate member, as shown in these figures. As another embodiment, the second insulator 213 may be an insulative coating layer filled in a portion at which the thickness of the flange 216 of the cap-up 217' is decreased by the height of the step 219. In this case, the second insulator 213 may be an insulating film such as a ceramic coating layer or oxide film.

Figure 6:
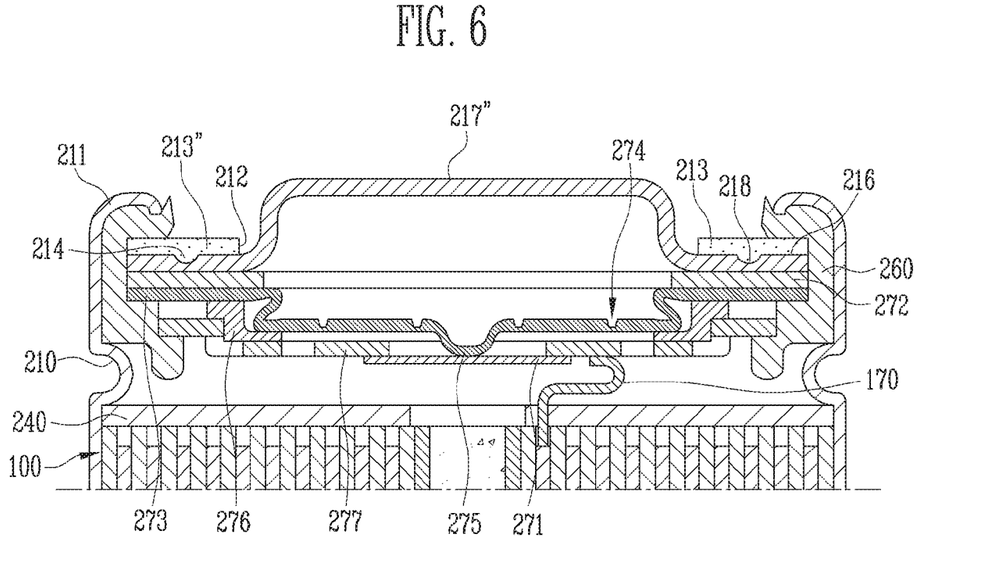
FIG. 6 is a partial sectional view showing a secondary battery to which a cap-up and a second insulator are applied according to a further embodiment.
Figure 7:
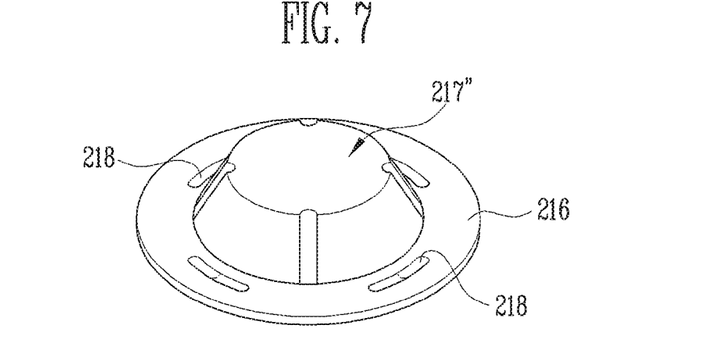
FIG. 7 is a perspective view of the cap up according to the further embodiment shown in FIG. 6.

FIG. 6 is a sectional view showing a cap assembly of a secondary battery, to which a cap-up 217" and a second insulator 213" are applied, according to further embodiment. FIG. 7 is a perspective view of the cap-up 217" according to the embodiment shown in FIG. 6.

The secondary battery according to embodiment of FIG. 6 includes an electrode assembly 100, a plurality of insulating plates 230 and 240, a center pin 250, a case 200 accommodating the electrode assembly 100, a cap assembly 270 coupled to an opening of the case 200, and a first insulator 260 and a second insulator 213", which seal, together with the cap assembly 270, the opening of the case 200.

The electrode assembly 100, the plurality of insulating plates 230 and 240, the center pin 250, the case 200, and the first member 260 are the same as described with reference to FIGS. 1 to 3. Like components are designated by like reference numerals, and repeated detailed descriptions thereof may be omitted.

The cap assembly 270 includes a cap-up 217" serving as an electrode terminal, and includes a current interrupt device provided between the cap-up 217" and the electrode assembly 100. The current interrupt device is the same as described with reference to FIGS. 1 to 3. Like components are designated by like reference numerals, and repeated detailed descriptions thereof may be omitted.

The cap-up 217" according to this embodiment is further provided with grooves 218 formed in the flange 216 of the cap-up 217". The cap-up 217" according to the present embodiment is provided with arc-shaped grooves 218 extending in the circumferential direction in the flange 216 of the cap-up 217".

The second insulator 213" according to this embodiment is further provided with a projection 214 formed on the second insulator 213". In the second insulator 213" according to the present embodiment, the projection 214 is protruded toward a flange 216 of the cap-up 217", and is inserted into the groove 218 of the cap-up 217". The projection 214 of the second insulator 213" is coupled into the groove 218 of the cap-up 217" such that the second insulator 213" is mounted on the flange 216 of the cap-up 217". In addition, the second insulator 213" may be compressed (i.e. pressurized) toward the flange 216 of the cap-up 217" by a clamping portion 211.

In FIG. 7, it is illustrated that several arc-shaped grooves 218 are provided in the cap-up 217". However, the present disclosure is not limited thereto, and the number of the grooves 218 may be one or more. In addition, the shape of the grooves 218 formed in the flange 216 of the cap-up 217" is not limited to the arc shape, and may be a circular, polygonal, or linear shape. Also, the arrangement direction of the grooves 218 is not limited to the circumferential direction.

According to the present disclosure, an insulator is provided in a double structure on the cap-up, thereby improving durability.

Example embodiments have been disclosed herein, and although specific terms are employed, they are used and are to be interpreted in a generic and descriptive sense only and not for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims and their respective equivalents.

What is claimed is:

1. A secondary battery comprising:
an electrode assembly comprising a first electrode, a second electrode, and a separator between the first electrode and the second electrode;
a cap-up electrically connected to the first electrode;
a case accommodating the electrode assembly therein, the case defining an opening in which the cap-up is inserted;
a first insulator between the cap-up and the case; and a second insulator between the first insulator and the cap-up, the second insulator contacting the first insulator, wherein the second insulator has a higher melting point than the first insulator; and wherein the cap-up comprises a circumferential flange extending outward in a radial direction to an outer edge, the outer edge being adjacent to the first insulator along the radial direction, and the second insulator is directly on and contacting the cap-up and has the same diameter or a smaller diameter than the circumferential flange.

2. The secondary battery of claim 1, wherein the second insulator is between the circumferential flange of the cap-up and the first insulator.

3. The secondary battery of claim 2, wherein the case comprises a clamping portion bent toward the second insulator at an edge of the case at the opening, and wherein the first insulator is compressed toward the second insulator by the clamping portion.

4. The secondary battery of claim 3, wherein the first insulator extends to the outside of the case between the clamping portion and the second insulator.

5. The secondary battery of claim 4, wherein the second insulator extends inward in the radial direction of the cap-up between the first insulator and the cap-up.

6. The secondary battery of claim 4, wherein at least one portion of the second insulator extends outside the first insulator.

7. The secondary battery of claim 2, wherein the second insulator is ring shaped with internal and external diameters, and wherein the cap-up comprises:

a convex portion convexly protruding outside of the case through an opening defined by the internal diameter of the second insulator; and the circumferential flange extending outward in the radial direction from the convex portion of the cap-up, the second insulator being mounted on the circumferential flange of the cap-up.

8. The secondary battery of claim 7, wherein the circumferential flange of the cap-up has a step that engages a portion of the second insulator at the internal diameter of the second insulator.

9. The secondary battery of claim 7, wherein the circumferential flange of the cap-up defines at least one groove to be engaged with the second insulator, and wherein the second insulator comprises a projection inserted into the groove.

10. The secondary battery of claim 7, wherein the second insulator is at least partially coated on the circumferential flange of the cap-up.

11. A secondary battery comprising:

an electrode assembly comprising:
a first electrode;
a second electrode; and
a separator between the first electrode and the second electrode;

a cap assembly electrically connected to the first electrode, and comprising:
a cap-up; and
a current interrupt device between the electrode assembly and the cap-up, and electrically connected to the cap-up;

a case accommodating the electrode assembly therein, and defining an opening in which the cap assembly is inserted;

a first insulator between the cap assembly and the case; and a second insulator between the first insulator and the cap assembly, and having a higher melting point than the first insulator, the second insulator contacting the first insulator; and wherein the cap-up comprises a circumferential flange extending outward in a radial direction to an outer edge, the outer edge being adjacent to the first insulator along the radial direction, and the second insulator is directly on and contacting the cap-up and has the same diameter or a smaller diameter than the circumferential flange.

12. The secondary battery of claim 11, wherein the second insulator is between the cap-up and the first insulator.

13. The secondary battery of claim 11, wherein the cap-up convexly protrudes away from the current interrupt device by passing through an opening defined by the second insulator.

* * * * *